Patented June 15, 1926.

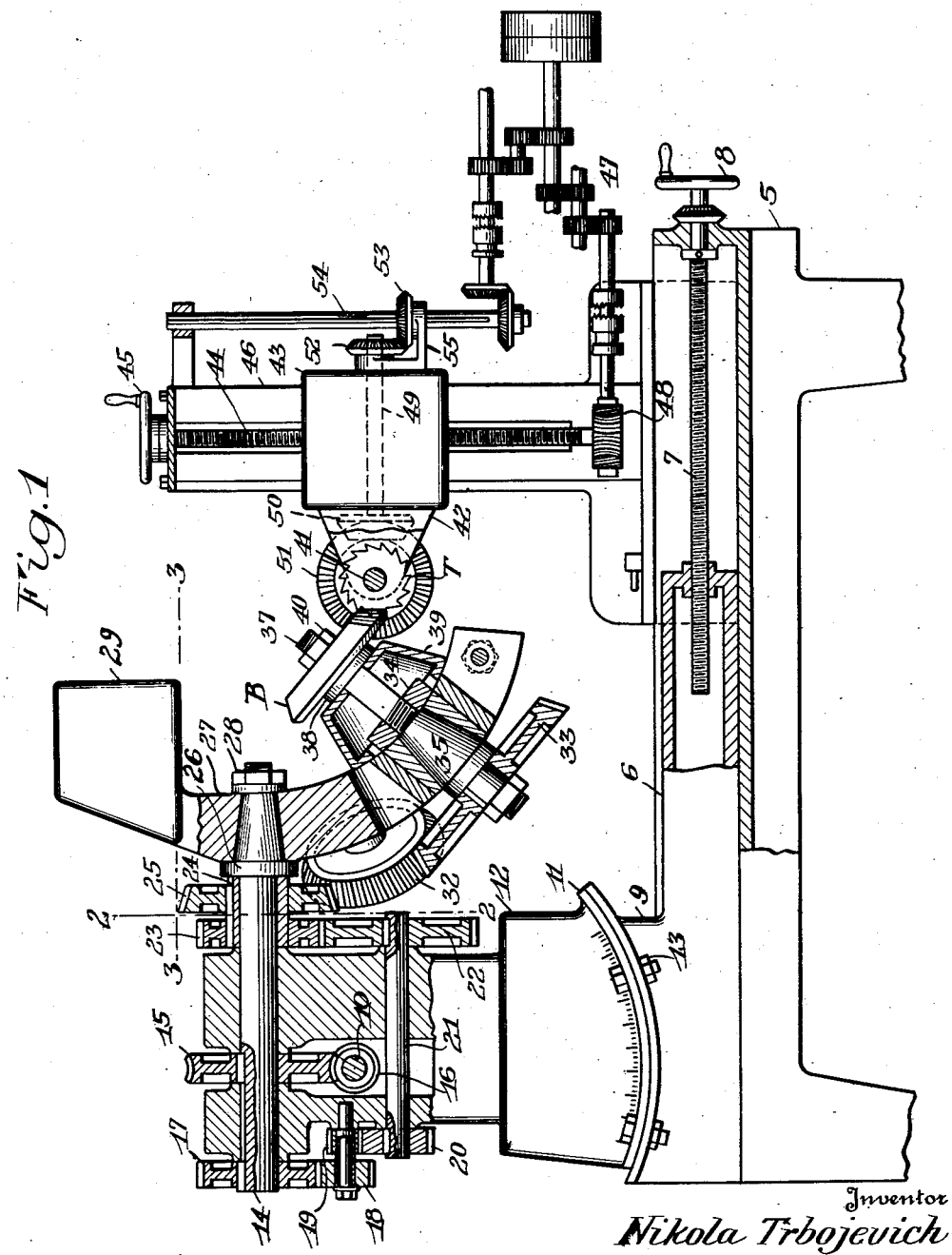

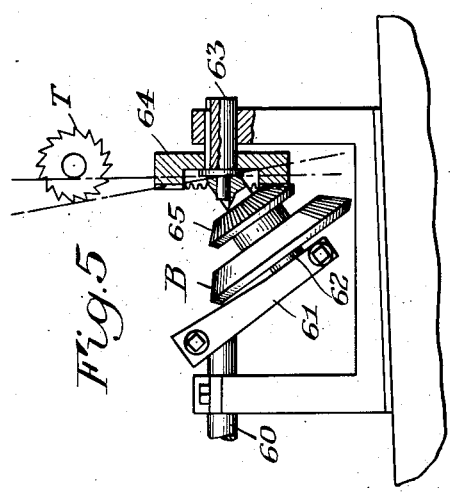
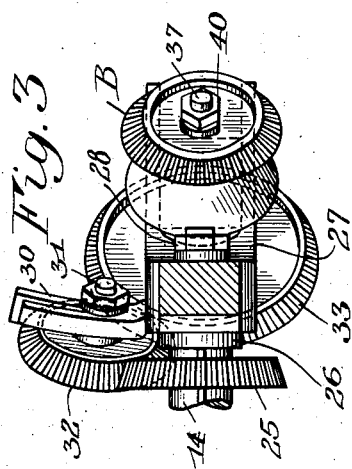
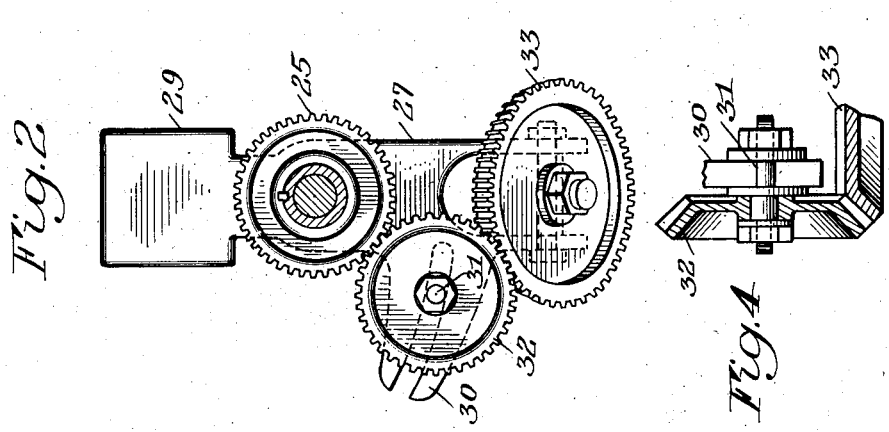
Inventor
Nikola Trbojevich

1,588,560.

UNITED STATES PATENT OFFICE.

NIKOLA TRBOJEVICH, OF HIGHLAND PARK, MICHIGAN, ASSIGNOR TO GLEASON WORKS, OF ROCHESTER, NEW YORK, A CORPORATION OF NEW YORK.

METHOD OF GENERATING GEARS.

Original application filed December 20, 1920, Serial No. 431,890. Divided and this application filed March 14, 1925. Serial No. 15,701.

My invention relates to a method of generating gears, this application being a division of my application for a machine for generating bevel gears, filed December 20, 1920, Serial No. 431,890.

The principal object of this invention is the provision of a method for producing gears in which the blank is automatically indexed, or in other words, in which the blank is so moved that it is brought into proper registration with the tool to produce the desired number of corresponding equi-distant teeth without necessitating the manual or mechanical readjustment of the blank and tool every time a new tooth is to be operated upon.

Another object of the invention is the provision of a method for producing gears, in which the blank is given a rolling motion while in engagement with the tool to generate the teeth and is moved in a closed path to index.

A further object is the provision of a method for producing straight tooth beveled gears by a continuous indexing motion of the blank.

With the above and other objects in view, the invention resides in the novel steps which constitute the new process and in the novel features described hereinafter, illustrated in the accompanying drawings and set forth in the claims appended hereto.

For the purpose of clearly describing my invention, reference is had to the accompanying drawings, in which I have illustrated a specific mechanism by which my new process may be practised, it being understood, however, that my invention is not limited to the employment of the specific mechanism shown but is capable of being practised in various ways within the scope of the invention and the limits of the appended claims.

In the drawings:

Figure 1 is a side elevation of a bevel gear cutting machine operating according to my invention, a portion thereof being shown in section.

Figure 2 is a vertical section on the line 2—2 of Fig. 1.

Figure 3 is a section on the line 3—3 of Fig. 1.

Fig. 4 is a detail view.

Figure 5 is a side elevation of a modified machine operating according to my invention.

The machine illustrated in the drawings is a bevel gear generating machine and it is in connection with such a machine that I have described the new process. It is to be understood however, that my invention, in certain features, particularly, is not limited to the production of bevel gears but may be employed in the production of gears of other types whether cylindrical or non-cylindrical.

In a machine for producing bevel gears according to my invention the blank is given a motion of rolling on the basic rack or crown gear during the time of its engagement with the tool, which represents a tooth of the basic rack or crown gear, and is moved in a closed path to return it periodically into engagement with the tool. The first motion is for the purpose of generating teeth on the blank, the second motion is for the purpose of indexing. These motions or operations may be produced in various ways.

Referring to Fig. 1 of the drawings 5 represents the supporting frame or table of my improved machine, 6 the bed that is situated in one end of the channeled top thereof and is adjustable longitudinally therein by means of a longitudinally disposed screw 7. One end of this screw extends through the closed end of the top of the table and has a hand-wheel 8 on its outer end with which to turn it. The end of the bed opposite that engaged by the screw 7 has a raised seat 9, whose upper laterally flanged surface is curved to conform to a segment of a circle struck from the center of a transverse drive shaft 10. The correspondingly curved flanged base 11 of a head 12 is seated on the seat 9 and just above its flanges the side of said base is provided with graduations to determine the extent to which it may be required to move the head in order to produce the desired taper on the teeth of the bevel gear blank being produced, as will be hereinafter apparent. When so adjusted the head can be maintained in its proper position by the bolts and nuts 13.

A longitudinal shaft or work arbor 14 is journaled in the upper portion of the head 12 and is revolved through the medium of a worm gear 15, keyed to the shaft 14 between divided portions of the upper portion of the head 12. The worm gear 15 is driven from a worm 16 mounted on the drive shaft 10 and extending between the furcated sides of the upper portion of the head. The ends of the work arbor extend beyond its bearings, and its rear end has a gear 17 keyed thereto which through idlers 18 and 19 imparts a reduced speed to a gear 20 keyed to a longitudinal shaft 21 mounted parallel to the shaft 14 and journaled in the head 12 below the drive shaft 10.

Keyed to the end of the shaft 21 opposite the gear 20 is a gear 22 which is larger than the gear 20 and meshes with a smaller gear 23 keyed to a sleeve 24 rotatably mounted on the projecting end of the shaft 14. Keyed also to the sleeve 24 is a bevel gear 25. The shaft 14 is provided with a collar 26 which serves to retain the sleeve 24 against longitudinal movement and serves as a seat for the arm 27 which is mounted on the shaft 14 and retained in position thereon by means of the nut 28, the shaft 14 being provided with a tapered bearing for the arm. This arm 27 is segmental in shape and its curvature is struck from a point in alignment with the axis of the shaft 14. One branch of this arm is provided with an integral counter-weight 29, and the branch opposite the counter-weight 29 is bifurcated.

Near the crotch of this bifurcation the arm has a laterally projecting bifurcated arm 30, and between the furcations of the arm 30, is mounted a stud 31 upon which is loosely mounted a bevel gear 32 adapted to mesh with the bevel gear 25. The position of the bevel gear 32 may be adjusted by moving the stud in a slot between the furcations of the arm 30, and the bevel gear may be retained in any adjusted position by means of a nut threaded on one end of the stud.

The bevel gear 32 meshes also with a bevel gear 33 which is keyed to the end of a spindle 37 whose axis alines with the center from which the curvature of the segmental arm 27 is struck. This spindle is retained in position on the segmental arm by means of a nut 34 which is screw threaded on the spindle and serves to force the taper portion 35 thereof into secure engagement with a correspondingly recessed seat provided in the arm. The nut is of such size that, when it is screwed home it bears against the contiguous annular portion of the segmental arm to confine the spindle in its bearing without binding the same.

Near the end of the spindle opposite the gear 34 is mounted a washer 38 between which and the segmental arm is mounted a hollow spacing shell 39. Mounted on the end of the spindle 37 opposite the gear 34 is the blank B which is to be operated upon. This blank is retained in position on the spindle by a nut 40.

In the machine illustrated the teeth are produced on the blank by means of a milling tool T. This tool is provided preferably with straight sides so that it represents a tooth of the basic rack or crown gear upon which the blank is theoretically rolling during the time of engagement of the tool therewith. The cutting teeth of the tool are further preferably shaped so as to cut simultaneously both sides of the space between the teeth. This tool T is securely mounted on one end of a transverse shaft 41 which is journaled in suitable bearings provided in the brackets 42 projecting from a vertically adjustable head 43, which can be moved on the vertical column 46 by means of the screw 44 which is journaled in the column and which may be operated either through the medium of a hand wheel 45 mounted on its upper end or by gearing 47 which drives the worm wheel 48 which is secured to its lower end. The shaft 41 is driven by a longitudinally disposed jack-shaft 49 which is journaled in the head 43, through the medium of bevel gears 50 and 51. Secured to the rear end of the shaft 49 is a miter gear 52 which engages and is driven by a miter gear 53 which is splined on the shaft 54 and is held in engagement with the gear 52 during adjustment of the head by the bracket 55 which projects rearwardly from the head. By this arrangement the shaft 41 can be rotated in any position of vertical adjustment of the head.

In operation the segmental arm revolves at the same speed as the work arbor 14, but the speed of the blank is suitably changed by a train of gears connecting the arbor and blank spindle. As the segmental arm revolves, the gear blank is given such a movement on an axis oblique to the axis of rotation of the arm that once in every revolution about the axis of the work arbor the blank comes into rolling contact with the teeth of the revolving tool which is located in a transverse vertical plane that is substantially at right angles to the plane of the axis of the work arbor. By the arrangement of the axes of the spindle and work arbor, therefore, the blank is given a rolling motion as of its pitch surface rolling without slipping on a plane surface during engagement with the tool, so that the teeth of the gear may be generated. Some of the train of gears through which the motion to the spindle 37 is imparted have relatively prime numbers of teeth. As a consequence of this feature of my invention the gear blank comes into rolling contact with the tool once during every cycle of its planetary movement and a new tooth section of the blank is engaged by the tool during each operating contact. The machine is, therefore, self indexed.

By adjusting the head 12 on its seat the correct position of the blank may be obtained so as to enable the tool to make the proper cut in the cone surface of the same, and by adjusting the bed 6 longitudinally by means of the screw 7 the depth of the teeth can be regulated.

For producing straight tooth bevel gears the tool may be fed across the face of the blank by the screw 44, or if desired the teeth may be completely cut with the tool retained in one position during its continuous rotation about its axis, or if desired these two movements of the tool may be combined.

In Fig. 5 of the drawings, I have illustrated another and simpler form of machine upon which my invention may be practiced. In this form the supporting column for the tool and the means for actuating and adjusting the same, (which are not shown), are substantially the same as those described with reference to Fig. 1.

The work arbor 60 of this simpler form has an arm 61 secured to its inner end and said arm extends obliquely therefrom and has a stud 62 securely mounted thereon that projects therefrom toward the adjacent end of a shaft 63 fixedly mounted in the frame of the machine. The axis of this shaft 63 alines with the axis of the arbor 60.

A stationary crown gear 64 is keyed to the shaft 63 and this crown gear is engaged by a master gear 65 having a relatively prime number of teeth. The master gear is rotatably mounted on the adjacent end of the stud 62. The blank to be operated upon is keyed to the master gear between said gear and the arm 61. The blank revolves with the master gear, so that when the shaft 60 is revolved and the master gear rolls on and is revolved by the crown gear, the blank is given a rolling motion past the tool. The crown gear in this modification serves not only to impart a proper generating motion to the blank but to return the same periodically into engagement with the tool.

In each of the machines described, the blank is moved throughout the whole of its planetary movement, as though rolling without slipping on a plane surface. This generating roll is necessary, however, only during the time of engagement of the tool with the blank. In either embodiment, therefore, if desired, the gearing controlling the blank movements may be modified so that while the blank is given the required generating roll during the tooth producing operation, its motion throughout the other parts of its closed path will be only such as required to bring the desired portion of it back into engagement with the tool.

While I have described my invention in connection with machines employing milling cutters it is obvious that the same may be practiced with any other suitable type of tool such as grinding tools, planing tools, etc. The invention is further capable of modification within its scope and the limits of the appended claims.

Having thus described my invention, what I claim is:

1. The method of generating gears which consists in imparting a relative rolling motion, continuously in one direction, between a gear blank and a continuously rotating tool to generate teeth on the blank while tool and blank are in engagement and to return the blank periodically into engagement with the tool.

2. The method of generating gears which consists in rotating a gear blank on its axis and simultaneously moving it in a transverse orbit relative to a rotating tool, having a pre-determined position relative to said orbit, said orbital movement being in such timed relation with the blank rotation that a different portion of the blank is presented to the tool each time the blank comes into engagement therewith.

3. A method of generating gears in which the gear blank has a continuous planetary movement and is actuated by gearing having relatively prime numbers of teeth which impart to said blank a rotation that once during each cycle of said planetary motion brings a new tooth section of the blank in rolling contact with a tool.

4. A method of generating gears which consists in rolling a blank on a plane surface past a continuously rotating tool to generate the teeth and in a closed path to present the blank periodically to the tool.

5. A method of generating gears which consists in rolling a blank on a plane surface while in engagement with a tool to generate teeth thereon and in a closed path to index the blank.

6. The method of generating gears which consists in employing a rotary tool having an effective operating portion, representing a rack tooth, rotating said tool on its axis and imparting a relative rolling motion between said tool and a gear blank continuously in one direction to periodically bring the tool and blank into engagement, said rolling motion being in the manner of a gear rolling on its pitch surface along a plane surface, when tool and blank are in engagement, whereby the teeth are generated on the blank.

7. The method of producing gears which consists in rotating a gear blank on its axis and simultaneously imparting an additional relative movement between the blank and a continuously rotating tool, about an axis intersecting the blank axis, in such timed relation with the blank rotation that the blank is automatically indexed.

8. A method of generating gears adapted to mesh with a basic crown gear which consists in rolling a blank on an imaginary crown gear while in engagement with the tool representing a tooth of the crown gear to generate the teeth and to return the blank periodically into engagement with the tool.

9. A method of generating gears adapted to mesh interchangeably with a basic crown gear in which the blank has a continuous planetary motion relatively to a tool representing a tooth of the basic crown gear and is actuated by gearing, one member of which has a tooth number prime to the tooth number of the crown gear represented by the tool whereby a different portion of the blank is presented to the tool each time the blank comes into engagement therewith.

10. A method of generating gears adapted to mesh with a basic crown gear in which the blank has a continuous planetary movement relatively to a tool representing a tooth of the basic gear and is actuated by gearing, one member of which is a crown gear which has a tooth number prime to the tooth number of the crown gear represented by the tool whereby a different portion of the blank is presented to the tool each time the blank comes into engagement therewith.

11. A method of generating straight tooth bevel gears which includes rotating a tool continuously about its own axis, while rotating a blank continuously about its axis and producing an additional relative rolling motion between tool and blank.

12. A method of producing straight tooth bevel gears which includes rotating a tool continuously about its own axis while rotating a blank continuously about its axis and imparting an additional relative rolling motion to the blank to generate the teeth.

13. A method of generating straight tooth bevel gears which includes moving a tool in a straight path while rotating a blank continuously on its own axis and imparting an additional relative movement between tool and blank in the manner of a crown gear rolling without slipping with the gear to be generated.

14. A method of generating straight tooth bevel gears which includes rotating a tool continuously about its own axis while moving it in a straight path across the face of a blank, rotating the blank continuously about its axis and imparting an additional relative movement between tool and blank in the manner of a crown gear rolling without slipping with the gear to be generated.

15. A method of generating gears adapted to mesh interchangeably with a basic rack which consists in rotating a tool representing a tooth of the basic rack continuously about its own axis, rotating a blank continuously about its axis and imparting to the blank an additional movement, in timed relation with the first named movement, in the manner of a gear rolling without slipping on the basic rack, whereby teeth are generated on the blank and the blank automatically indexed.

NIKOLA TRBOJEVICH.